UNITED STATES PATENT OFFICE 2,641,602

1,8-DIHYDROXY - 5 - NITRO - 4 - HYDROXY-ETHYLPHENYL AMINOANTHRAQUINONE COMPOUNDS

James M. Straley and Joseph B. Dickey, Kingsport, Tenn., assignors to Eastman Kodak Company, Rochester, N. Y., a corporation of New Jersey No Drawing. Application November 29, 1950, Serial No. 198,243

10 Claims. (Cl. 260—380)

This invention relates to new anthraquinone dyestuffs and their application to the art of dyeing or coloring. More particularly it relates to new anthraquinone dyestuffs which color textile materials made of or containing a cellulose alkyl carboxylic acid ester having two to four carbon atoms in the acid groups thereof, especially cellulose acetate textile materials, blue to greenish-blue shades.

So far as applicants are aware, no commercially available dyestuffs having a satisfactory degree of affinity for cellulose acetate textile materials color these materials in desirable blue shades which have satisfactory fastness with respect to both light and gas. Anthraquinone dyestuffs are available which color cellulose acetate textile materials blue shades which have reasonably satisfactory fastness to light but which leave much to be desired with respect to their resistance to gas fading. Similarly, azo dyestuffs are available which color cellulose acetate textile materials blue shades which have excellent resistance to gas fading but which leave much to be desired with respect to their fastness to light.

As just indicated, the known anthraquinone dyestuffs which have satisfactory affinity for cellulose acetate textile materials and which color these materials blue shades having reasonably satisfactory fastness to light leave much to be desired with respect to their resistance to gas fading. On prolonged exposure to burnt gas fumes or to ordinary city atmosphere conditions the dyeings obtained on cellulose acetate textile materials with these dyes undergo disagreeable color changes and/or a loss of strength. Depending upon the particular dyestuff, the dyeing may change from a blue shade to a reddish-blue or even a pink color. Gas fading is also known as acid fading and the two terms, as here used, are intended to be synonymous. Much research has been directed to the development of anthraquinone dyestuffs which dye cellulose acetate textile materials blue shades which have excellent fastness to both light and gas. However, while some progress has been made, the problem has not heretofore been solved. Efforts have been made to increase the resistance of the dyeings to gas fading by the use of inhibitors but this method is not particularly satisfactory because the application of such inhibitors is usually expensive and often inconvenient. Additionally, the effect is not permanent.

It is an object of our invention to provide new anthraquinone dyestuffs having good affinity for cellulose alkyl carboxylic acid esters having two to four carbon atoms in the acid groups thereof, textile materials, and dyeing said textile materials in level blue to greenish-blue shades which have excellent fastness to both light and gas. Another object is to provide a satisfactory process for the preparation of the new anthraquinone dyestuffs of the invention. A particular object is to provide new anthraquinone dyestuffs which are especially of value for the dyeing of cellulose acetate textile materials.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

We have discovered that the new anthraquinone compounds having the probable general formula:

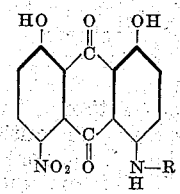

wherein R represents a phenylethyl alcohol nucleus are valuable dyes for coloring textile materials made of or containing a cellulose alkyl carboxylic acid ester having two to four carbon atoms in the acid groups thereof. These dye compounds when applied to the aforesaid materials give blue to bluish-green dyeings which have outstanding light and gas fastness properties. They are particularly of use for the coloration of cellulose acetate textile materials.

The remarkable resistance of the dyestuffs of the present invention to gas fading is shown by the fact that the dyeings obtained therewith on cellulose acetate textile materials undergo very little alteration in strength or shade even after exposure to as many as 6 and, in some cases, 7 AATCC gas-cycles. By contrast, various aminoanthraquinones such as 1,4-dimethylaminoanthraquinone, 1-methylamino-4-methoxyethylaminoanthraquinone, 1 - methylamino-4-β-hydroxyethylaminoanthraquinone, 1,4 - diaminoanthraquinone, 1,4,5,8-tetraaminoanthraquinone, 1,4-di-β-hydroxyethylamino - 5,8 - dihydroxyanthraquinone and 1-amino-4-methylaminoanthraquinone-2-carboxylic amide, which are used extensively to color cellulose acetate textile materials, are markedly changed after only 1 AATCC gas-cycle.

Similarly the outstanding light-fastness of our new dyestuffs is apparent from the fact that the dyeings obtained therewith on cellulose acetate textile materials show little fading after 60 hours exposure on the Fade-Ometer light-fastness apparatus. The significance of this will be apparent from the fact that dyeings on cellulose acetate which show little fading after 20 hours exposure on the Fade-Ometer light-fastness apparatus are considered good.

We are aware that U. S. Patent 2,480,269 discloses anthraquinone dyestuffs obtained by reacting polyhydroxy polynitro-anthraquinone compounds such as, for example, 4,8-dinitro-anthrarufin, 4,5-dinitro-chrysazin or 4,8-dinitro-anthrachrysone, with a primary aromatic amine such as aniline, toluidine, amino-ethylbenzene, amino-acetophenone or amino-phenol, for example. However, this patent does not disclose the dyestuffs of the present application and further the dyestuffs of the patent are inferior to the dyestuffs of the present application in at least two important respects. One, the dyestuffs of the present application have better affinity for cellulose acetate textile materials and two, they give more light-fast dyeings on cellulose acetate textile materials than do the dyestuffs of the U. S. Patent 2,480,269.

The new anthraquinone dyestuffs of the invention are prepared by condensing 4,5-dinitro-1,8-dihydroxyanthraquinone, also known as 4,5-dinitrochrysazin, with an aminophenylethyl alcohol. They can also be prepared by condensing 4,5-dinitro-chrysazin with an alkyl ester of an aminophenylethyl alcohol and hydrolyzing the ester compound resulting. The esterified compounds obtained when an alkyl ester of an aminophenylethyl alcohol is employed dye cellulose acetate textile materials greenish-blue shades which have good resistance to gas-fading but relatively poor light fastness.

The foregoing reaction can be carried out with or without the use of a solvent or diluent which does not undergo reaction with the reactants. However, the use of a substantial amount of a solvent or diluent such as, for example, water, nitrobenzene, o-nitrotoluene, quinoline, quinaldine, amyl alcohol, ethyl alcohol, butyl alcohol, pyridine, 2-methyl - 5 - ethylpyridine, diphenylamine, a phenol such as phenol or m-cresol, or an N,N-di-(low carbon alkyl) amide of a normal fatty acid having one to three carbon atoms such as N,N-dimethyl formamide, N,N-diethyl formamide, N,N-diisopropyl formamide, N,N-dimethyl acetamide, N,N-diethyl acetamide, N,N-dipropyl acetamide or N,N-dimethyl propionamide is preferred, as the use of such a solvent or diluent constitutes a distinct improvement from a practical viewpoint. Other diluents such as xylene and dichlorobenzene, for example, can be used, but, because of solubility factors, they do not appear to be as advantageous as the other solvents or diluents named hereinbefore, and consequently, it is preferred not to use them.

When the process is carried out using no diluent or only a small amount of diluent, or using an excess of the aminophenyl ethyl alcohol as the diluent, it is difficult to remove the reaction product completely from the reaction vessel and the process would be very inconvenient on a commercial scale. When suitable organic solvents or diluents having a boiling point higher than that of water, such as nitrobenzene, quinoline, amyl alcohol, pyridine, 2-methyl-5-ethyl pyridine, N,N-dimethyl acetamide or N,N-dimethyl formamide, for example, are used the reaction can be carried out at a temperature higher than when water is used, thus shortening the time of reaction. The use of N,N-dimethyl acetamide or N,N-dimethyl formamide, as a solvent or diluent, appears to be especially advantageous and is preferred.

Other than selecting a temperature high enough to effect the desired reaction and not so high as to cause the formation of an appreciable amount of undesirable by-products, the exact temperature employed does not appear to be critical. Thus, temperatures ranging from about 25° C. to about 200° C. can be used although we prefer to use temperatures from 110° C. to 170° C. Ordinarily temperatures lower than about 100 C. are not used as too long a reaction time is required when such temperatures are employed.

The use of an excess of the aminophenylethyl alcohol or alkyl ester of an aminophenylethyl alcohol reactant appears to give improved results. A molecular ratio of about 2 mols of the amine reactant for each mol of 4,5-dinitrochrysazin has been found very satisfactory. However, it will be understood that the desired product can be obtained using either a greater or lesser proportion.

The following examples, in which parts are expressed as parts by weight, illustrate the anthraquinone compounds of our invention and the manner in which they are prepared.

*Example 1*

100 parts of p-aminophenylethyl alcohol, 100 parts of 4,5-dinitro-1,8-dihydroxyanthraquinone and 600 parts of distilled technical quinoline are placed in a suitable reaction vessel and the resulting reaction mixture is heated to 150° C.-155° C. while stirring and maintained at this temperature for 4 hours while stirring. Then the reaction mixture is cooled and poured into 1500 parts of 10 per cent hydrochloric acid. The resulting mixture is warmed at 50° C.-60° C. for 30 minutes, filtered, and the product obtained on the filter is washed acid-free with water, and dried at 50° C.-60° C. 120 parts of a compound having the probable formula:

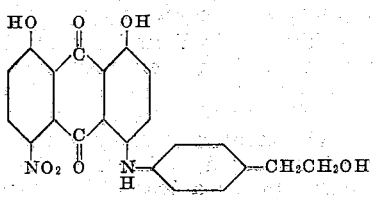

are obtained. It is a blue powder melting at about 110° C. and dyes cellulose acetate textile materials deep greenish-blue shades having exceptional fastness to light and having a resistance to gas-fading of 7AATCC units.

*Example 2*

50 parts of p-aminophenylethyl alcohol, 50 parts of 4,5-dinitro-1,8-dihydroxyanthraquinone and 175 parts of n-amyl alcohol are placed in a suitable reaction vessel and refluxed together, with stirring, for 6 hours. The reaction mixture is then cooled and 500 parts of 5% hydrochloric acid are added thereto. The n-amyl alcohol is removed from the reaction mixture by steam distillation and the reaction mixture remaining is filtered. The product obtained on the filter is washed with water and ground in a ball mill with 200 parts of a 2% aqueous sodium carbonate solution. The grind is filtered, washed neutral with water and dried at 60° C. 53 parts of a product identical with that of Example 1 are obtained.

Example 3

50 parts of 4,5-dinitro-1,8-dihydroxyanthraquinone as an 80% aqueous paste and 100 parts of a mixture of o- and p-aminophenylethyl alcohol (obtained by nitrating phenylethyl alcohol acetate, reducing the nitro group to an amino group and then hydrolyzing) are heated together at 120° C.–125° C., with stirring, for 5 hours. Upon cooling, the cooled reaction product is ground with 1,000 parts of 50% aqueous ethyl alcohol at 50° C. The reaction product is recovered by filtration, ground with 18% hydrochloric acid and the mixture thus formed is filtered. The product obtained on the filter is washed acid free with water and dried. The product obtained is a mixture of the compound obtained in Example 1 and the compound having the probable formula

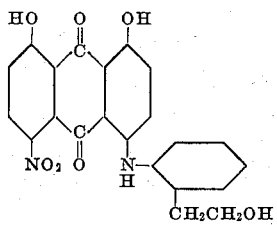

It colors cellulose acetate textile materials deep blue shades having fastness properties indistinguishable from that of the product of Example 1.

Example 4

15 parts of 4,5-dinitro-1,8-dihydroxyanthraquinone, 15 parts of o-aminophenylethyl alcohol and 75 parts of pyridine are placed in an autoclave and heated with stirring at 155° C.–160° C. for 3 hours. Then the reaction mixture is cooled and poured into 350 parts of 10% hydrochloric acid and filtered. The product obtained on the filter is washed acid free with water and dried at 50° C.–60° C. 15.8 parts of the compound having the probable formula

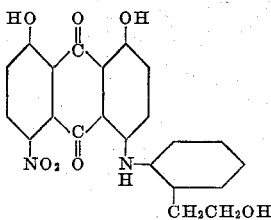

are obtained. It dyes cellulose acetate textile materials greenish-blue shades having exceptional fastness to light and having a resistance to gas fading of 6AATCC units.

Example 5

15 parts of 4,5-dinitro-1,8-dihydroxyanthraquinone, 15 parts of p-aminophenylethyl alcohol and 100 parts of ethyl alcohol are placed in an autoclave and heated with stirring at 150° C.–160° C. for 4 hours. The cooled reaction mixture is poured into 350 parts of 10% hydrochloric acid and filtered. The product obtained on the filter is washed acid free with water and dried at 50° C.–60° C. 15.6 parts of a product identical with that of Example 1 are obtained.

Example 6

100 parts of 4,5-dinitro-1,8-dihydroxyanthraquinone, 100 parts of p-aminophenylethyl alcohol and 600 parts of 2-methyl-5-ethyl pyridine are placed in a suitable reaction vessel and heated, with stirring, at 135° C. until the shade of a sample dissolved in acetone shows no further change. Then the reaction mixture is cooled and poured into 2,000 parts of 12% hydrochloric acid. The resulting mixture is warmed at 50° C.–60° C. for 30 minutes, filtered, and the product obtained on the filter washed acid free with water and dried at 50° C.–60° C. 122 parts of a product identical with that of Example 1 are obtained.

Example 7

15 parts of 4,5-dinitro-1,8-dihydroxyanthraquinone, 20 parts of the acetate of p-aminophenylethyl alcohol and 100 parts of quinoline are placed in a suitable reaction vessel and heated, with stirring, at 150° C.–155° C. for 2 hours while allowing the water formed during the reaction to distil off. Then the reaction mixture is cooled and poured into about 350 parts of 10% hydrochloric acid and filtered. The product obtained on the filter is washed acid free with water and dried at 50° C. 16.2 parts of a compound having the probable formula

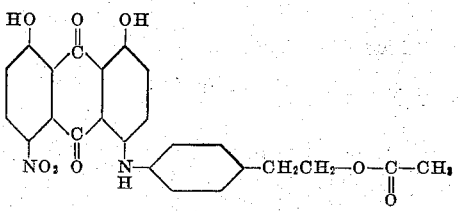

are obtained. It dyes cellulose acetate textile materials blue-green shades which have good resistance to gas fading but relatively poor light fastness.

12 parts of the product obtained as described above are refluxed for 6 hours with a solution of 10 parts of concentrated hydrochloric acid and 120 parts of ethanol. Upon cooling, the mixture is diluted with water, filtered and the product obtained on the filter is washed acid free with water. 10 parts of a product identical with that of Example 1 are obtained.

Example 8

15 parts of 4,5-dinitro-1,8-dihydroxyanthraquinone and 30 parts of crude mixed o- and p-aminophenylethyl alcohol acetate (obtained by nitrating phenylethyl alcohol acetate and reducing the nitro group to an amino group) are placed in a suitable reaction vessel and heated, with stirring, at 120° C.–125° C. for 6 hours. The hot reaction mixture is poured into a solution of 40 parts of concentrated hydrochloric acid in 400 parts of methyl alcohol and the resulting reaction mixture is refluxed, with stirring, for 8 hours. The reaction mixture thus obtained is diluted with water and filtered and the product obtained on the filter is ground with a 2% soda ash solution and filtered. The product thus obtained on the filter is washed neutral with water and dried. 14.2 parts of a product identical with that of Example 3 are obtained.

Example 9

15 parts of 4,5-dinitro-1,8-dihydroxyanthraquinone 15 parts of p-aminophenylethyl alcohol and 100 parts of nitro-benzene are placed in a suitable reaction vessel and heated with stirring at 165° C.–170° C. for 2 hours. Upon cooling, the reaction mixture is diluted with four times its volume of ligroin and filtered. The product obtained on the filter is washed with ligroin and then stirred for 30 minutes at 60° C. with a 10% hydrochloric acid solution. The mixture thus obtained is filtered and the product obtained on the filter is washed with water until neutral and then ground with a 2 per cent soda ash solution. This mixture in turn is filtered and the product collected on the filter is washed with water until neutral. 14 parts of a product identical with that of Example 1 are obtained.

*Example 10*

33 parts of 4,5-dinitro-1,8-dihydroxyanthraquinone, 14 parts of p-aminophenylethyl alcohol and 10 parts of anhydrous potassium acetate in 100 parts of quinoline are placed in a suitable reaction vessel and heated with stirring at 150° C.–160° C. for 4 hours. Then the reaction mixture is cooled and poured into 500 parts of 10% hydrochloric acid. The resulting mixture is warmed at 50° C.–60° C. for 30 minutes, filtered, and the product obtained on the filter is washed acid free with water. This product is then ground with a 2% soda ash solution, following which the reaction mixture is filtered and the product obtained on the filter is washed with water until neutral. 12.6 parts of a product identical with that of Example 1 are obtained.

*Example 11*

20 parts of 4,5-dinitro-1,8-dihydroxyanthraquinone, 40 parts of p-aminophenylethyl alcohol and 100 parts of N,N-dimethylacetamide are placed in a suitable reaction vessel and heated, with stirring, at 120° C.–125° C. for 4 hours. Then the reaction mixture is poured into 1,000 parts of 2% hydrochloric acid stirred well, filtered, and the product obtained on the filter is washed with water until neutral and dried. 22 parts of a product identical with that of Example 1 are obtained.

*Example 12*

20 parts of 4,5-dinitro-1,8-dihydroxyanthraquinone, 40 parts of a mixture of o- and p-aminophenylethyl alcohol (obtained by nitrating phenylethyl alcohol acetate, reducing the nitro group to an amino group and then hydrolyzing) and 100 parts of N,N-dimethylformamide are placed in a suitable reaction vessel and heated, with stirring, at 120° C.–125° C. for 4 hours. The reaction mixture thus obtained is poured into 1,000 parts of 2% hydrochloric acid, stirred well, filtered, and the product obtained on the filter is washed with water until neutral and dried. Twenty parts of a product which is apparently identical with that of Example 3 are obtained.

*Example 13*

100 parts of p-aminophenylethyl alcohol, 100 parts of 4,5-dinitro-1,8-dihydroxyanthraquinone and 600 parts of phenol are placed in a suitable reaction vessel, and the resulting reaction mixture is heated to 150° C.–155° C. while stirring and maintained at this temperature for 4 hours while stirring. Then the reaction mixture is cooled and poured into 1500 parts of 10% hydrochloric acid. The resulting mixture is warmed at 50° C.–60° C. for 30 minutes while stirring, filtered, and the product obtained on the filter is washed acid-free with water and then thoroughly ground with a 2% soda ash solution. This mixture is filtered and the product collected on the filter is washed with water until neutral and dried. 107 parts of a product identical with that of Example 1 are obtained.

*Example 14*

50 parts of 4,5-dinitrochrysazin, 90 parts of 2-methyl-3-aminophenyl alcohol and 200 parts of N,N-dimethyl acetamide are heated together at 120° C.–155° C. for 4 hours while stirring. Then the reaction mixture is cooled and poured into 1,000 parts of 5% hydrochloric acid. The resulting mixture is warmed at 50° C.–60° C. for 30 minutes while stirring, filtered, and the product obtained on the filter is washed free of acid with water and dried. 65 parts of a compound having the probable formula:

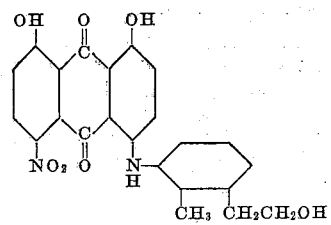

are obtained. It dyes cellulose acetate textile materials blue shades having excellent fastness to light and gas.

*Example 15*

20 parts of 4,5-dinitrochrysazin, 30 parts of 4-chloroaminophenylethyl alcohol (prepared by nitrating p-chlorophenylethyl acetate, reducing the nitro body and hydrolyzing) and 100 parts of N,N-dimethylacetamide are placed in a suitable reaction vessel and heated, with stirring, at 130° C.–135° C. for 6 hours. The resulting solution is poured into 1,000 parts of 2% hydrochloric acid, stirred well, filtered, and the product obtained on the filter is washed free of acid with water and dried. 22 parts of a product dyeing cellulose acetate textile materials blue shades having excellent fastness to light and gas are obtained.

*Example 16*

40 parts of m-aminophenylethyl alcohol and 10 parts of 4,5-dinitrochrysazin are heated together at 125° C.–130° C. with good stirring for 6 hours. The resulting melt is poured into 1,000 parts of 50% ethyl alcohol containing 20 parts of hydrogen chloride. After stirring at 50° C.–60° C. for 1 hour, the mixture is diluted with an equal volume of water and filtered. The product collected on the filter is washed with water until neutral and dried. 16 parts of a compound having the probable formula:

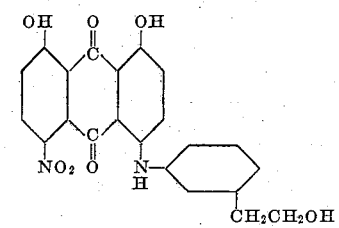

are obtained. It dyes cellulose acetate textile materials blue shades having excellent fastness to light and gas.

*Example 17*

10 parts of p-aminophenylethyl alcohol, 5 parts of 4,5-dinitro-1,8-dihydroxyanthraquinone and 58 parts of N,N-dimethyl-acetamide were placed in a suitable reaction vessel and allowed to stand at room temperature (25° C.–30° C.) for thirty days. The reaction mixture was then poured into 1,000 parts of water containing 5% by weight of hydrogen chloride and the resulting mixture was filtered. The product obtained on the filter was washed free of acid. The precipitate thus obtained was ground in a ball mill with 100 parts of a 1% aqueous sodium carbonate solution, filtered, and the product collected on the filter was washed neutral with water. 2.5 parts of a product identical with that of Example 1 were obtained.

*Example 18*

10 parts of 4,5-dinitrochrysazin and 40 parts of p-aminophenylethyl alcohol are heated together on a steam bath for 4 hours. The hot melt thus obtained is poured slowly into 1000 parts of iced 10% hydrochloric acid with good agitation and stirred for 2 hours. The reaction mixture is then filtered and the product obtained on the filter is washed with 100 parts of 50% ethyl alcohol and dried. 10.1 parts of a product identical with that of Example 1 are obtained.

m-Aminophenylethyl alcohol is prepared as follows: m-nitrophenylacetic acid is reduced at 50° C.–55° C. to m-aminophenylacetic acid in ethyl alcohol over Raney nickel. Ethyl alcohol is removed in vacuo from the reaction mixture and the residue consisting essentially of m-aminophenylacetic acid is placed in a Soxhlet apparatus and reduced to m-aminophenylethyl alcohol in the presence of a boiling ethyl ether solution of a large excess of lithium aluminum hydride. Upon working up the reaction mixture m-aminophenylethyl alcohol boiling at 135° C.–138° C./2 mm. is obtained.

The 4-chloroaminophenylethyl alcohol used in Example 15 is prepared as follows: p-chlorophenylethyl acetate is nitrated at 10° C. in acetic anhydride with concentrated nitric acid. The reaction mixture obtained is drowned in water and the oil obtained is hydrolyzed in alcoholic hydrogen chloride. The drowned hydrolysis product is reduced at room temperature in absolute ethyl alcohol over Adam's catalyst and distilled under reduced pressure. 4-chloroaminophenylethyl alcohol boiling at 155° C.–160° C./1.5 mm. is obtained as a viscous oil.

The new anthraquinone dye compounds of our invention may be advantageously directly applied to the material undergoing coloration in the form of an aqueous suspension which can be prepared by grinding the dye to a paste in the presence of a sulfonated oil, soap, sodium lignin sulfonate, or other suitable dispersing agent and dispersing the resulting paste in water.

Direct dyeing operations can, with advantage, be conducted at temperatures of about 70° C.–90° C., but any suitable temperature can be used. Thus, the textile material such as cellulose acetate, for example, to be dyed or colored is ordinarily added to the dye bath at a temperature lower than that at which the main portion of the dyeing is to be effected, a temperature approximating 45° C.–55° C., for example, following which the temperature is raised to that selected for carrying out the dyeing operation. The temperature at which the dyeing is conducted may, of course, be varied somewhat, depending upon the particular material undergoing coloration. As is understood by those skilled in the dyeing art, the intensity of dyeing can be varied by varying the proportion of dye to material undergoing coloration. The amount of dye used can be, for example, 1/3% to 3% (by weight) of that of the textile material, although lesser or greater amounts of dye can be used.

We claim:
1. The anthraquinone compounds having the general formula:

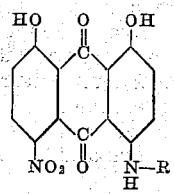

wherein R represents a phenylethyl alcohol nucleus.

2. The anthraquinone compounds having the general formula:

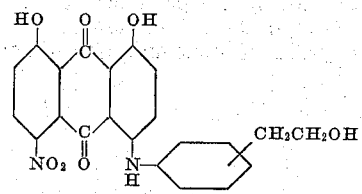

3. The anthraquinone compound having the formula:

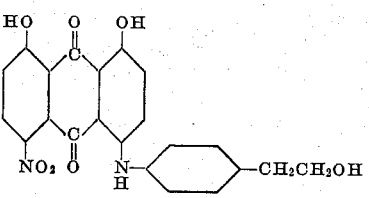

4. The anthraquinone compound having the formula:

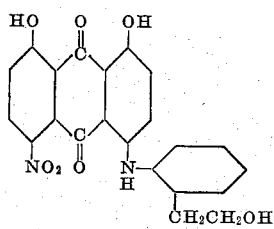

5. The anthraquinone compound having the formula:

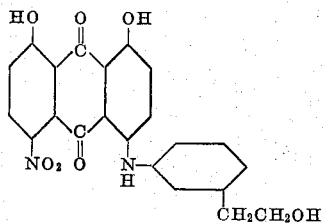

6. The anthraquinone compound having the formula:

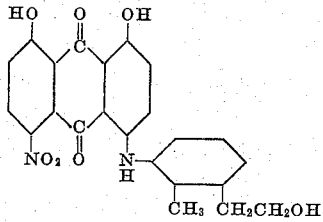

7. The process for the manufacture of anthraquinone compounds suitable for dyeing cellulose acetate which comprises condensing 4,5-dinitro-1,8-dihydroxyanthraquinone with an aminophenylethyl alcohol in the presence of a substantial amount of a diluent selected from the group consisting of N,N-dimethyl acetamide and N,N-dimethyl formamide.

8. The process for the manufacture of anthraquinone compounds suitable for dyeing cellulose acetate which comprises condensing 4,5-dinitro-1,8-dihydroxyanthraquinone with an aminophenylethyl alcohol at a temperature of from 110° C. to 170° C. in the presence of a substantial amount of a diluent selected from the group consisting of N,N-dimethyl acetamide and N,N-dimethyl formamide.

9. The process for the manufacture of anthraquinone compounds suitable for dyeing cellulose acetate which comprises condensing 4,5-dinitro-1,8-dihydroxyanthraquinone with an aminophenylethyl alcohol in the presence of a substantial amount of N,N-dimethyl acetamide.

10. The process for the manufacture of anthraquinone compounds suitable for dyeing cellulose acetate which comprises condensing 4,5-dinitro-1,8-dihydroxyanthraquinone with an aminophenylethyl alcohol at a temperature of from 110° C. to 170° C. in the presence of a substantial amount of N,N-dimethyl acetamide.

JAMES M. STRALEY.
JOSEPH B. DICKEY.

References Cited in the file of this patent

UNITED STATES PATENTS

| Number | Name | Date |
|---|---|---|
| 2,353,108 | Wurtz et al. | July 4, 1944 |
| 2,480,269 | Seymour et al. | Aug. 30, 1949 |

FOREIGN PATENTS

| Number | Country | Date |
|---|---|---|
| 439,885 | Great Britain | Dec. 9, 1935 |